US009823669B2

(12) United States Patent
Schmitz et al.

(10) Patent No.: US 9,823,669 B2
(45) Date of Patent: Nov. 21, 2017

(54) PRESSURE-REDUCING VALVE HAVING A RESIDUAL PRESSURE FUNCTION BUILT INTO THE REDUCING VALVE

(71) Applicant: Luxembourg Patent Company S.A., Lintgen (LU)

(72) Inventors: Jean-Claude Schmitz, Heisdorf (LU); Morgan Lamiable, Heumont (FR); Claude Risse, Bertrange (FR)

(73) Assignee: Luxembourg Patent Company S.A., Luxembourg (LU)

( * ) Notice: Subject to any disclaimer, the term of this patent is extended or adjusted under 35 U.S.C. 154(b) by 0 days.

(21) Appl. No.: 14/413,976

(22) PCT Filed: Jul. 5, 2013

(86) PCT No.: PCT/EP2013/064274
§ 371 (c)(1),
(2) Date: Jan. 9, 2015

(87) PCT Pub. No.: WO2014/009279
PCT Pub. Date: Jan. 16, 2014

(65) Prior Publication Data
US 2015/0205306 A1  Jul. 23, 2015

(30) Foreign Application Priority Data
Jul. 9, 2012  (LU) .......................................... 92040

(51) Int. Cl.
*F16K 31/12* (2006.01)
*G05D 16/10* (2006.01)
*F16K 31/122* (2006.01)

(52) U.S. Cl.
CPC ....... *G05D 16/103* (2013.01); *F16K 31/1221* (2013.01); *G05D 16/10* (2013.01); *Y10T 137/7825* (2015.04); *Y10T 137/7826* (2015.04)

(58) Field of Classification Search
CPC .... G05D 16/103; G05D 16/106; G05D 16/10; G16K 31/1221; Y10T 137/7826; Y10T 137/7825; Y10T 137/88046
See application file for complete search history.

(56) References Cited

U.S. PATENT DOCUMENTS 1,264,006 A * 4/1918 Bucknam ........... G05D 16/0602
137/505.12
1,660,842 A * 2/1928 Hoesel .................. F25B 41/062
137/495

(Continued)

FOREIGN PATENT DOCUMENTS

| GB | 2308425 A | 6/1997 |
|----|-----------|--------|
| GB | 2349200 A | 10/2000 |
| WO | 2009074668 A1 | 6/2009 |

OTHER PUBLICATIONS

International Search Report from corresponding International Application No. PCT/EP2013/064274, dated Oct. 22, 2013.

*Primary Examiner* — Jessica Cahill
(74) *Attorney, Agent, or Firm* — Polster Lieder

(57) ABSTRACT

The invention relates to a device for regulating the flow rate and/or pressure of a fluid, such as valve for a pressure gas cylinder, comprising a reducing valve including a first plug designed to be moved in the normal flow direction of the fluid during closure. The reducing valve also comprises a plunger to which the plug is coupled. The face of the plunger that is oriented towards the first plug defines a regulation chamber together with the body. The aforementioned face also comprises a seal that engages with a corresponding surface of the body such as to form a second plug for maintaining residual pressure. The regulation device also comprises a means for preloading and releasing a spring acting on the opposite face of the plunger.

21 Claims, 1 Drawing Sheet

(56) References Cited

U.S. PATENT DOCUMENTS

| | | | | |
|---|---|---|---|---|
| 2,082,227 A | * | 6/1937 | Stettner | G05D 16/0602 137/328 |
| 2,746,471 A | * | 5/1956 | Cobb | G05D 16/0655 137/495 |
| 2,833,304 A | * | 5/1958 | Fish | G05D 16/0655 137/495 |
| 3,451,421 A | * | 6/1969 | Vicenzi | G05D 23/12 137/495 |
| 4,275,764 A | * | 6/1981 | Baret | F16K 21/04 137/454.6 |
| 4,513,777 A | * | 4/1985 | Wright | G05D 7/0106 137/501 |
| 4,621,656 A | * | 11/1986 | Ichimaru | F16K 27/0263 137/242 |
| 6,026,850 A | * | 2/2000 | Newton | G05D 16/0655 137/505 |
| 7,814,931 B2 | | 10/2010 | Newton et al. | |
| 8,851,107 B2 | * | 10/2014 | Risse | F16K 1/443 137/505.12 |
| 2003/0066562 A1 | * | 4/2003 | Wakeman | G05D 16/10 137/505 |

\* cited by examiner

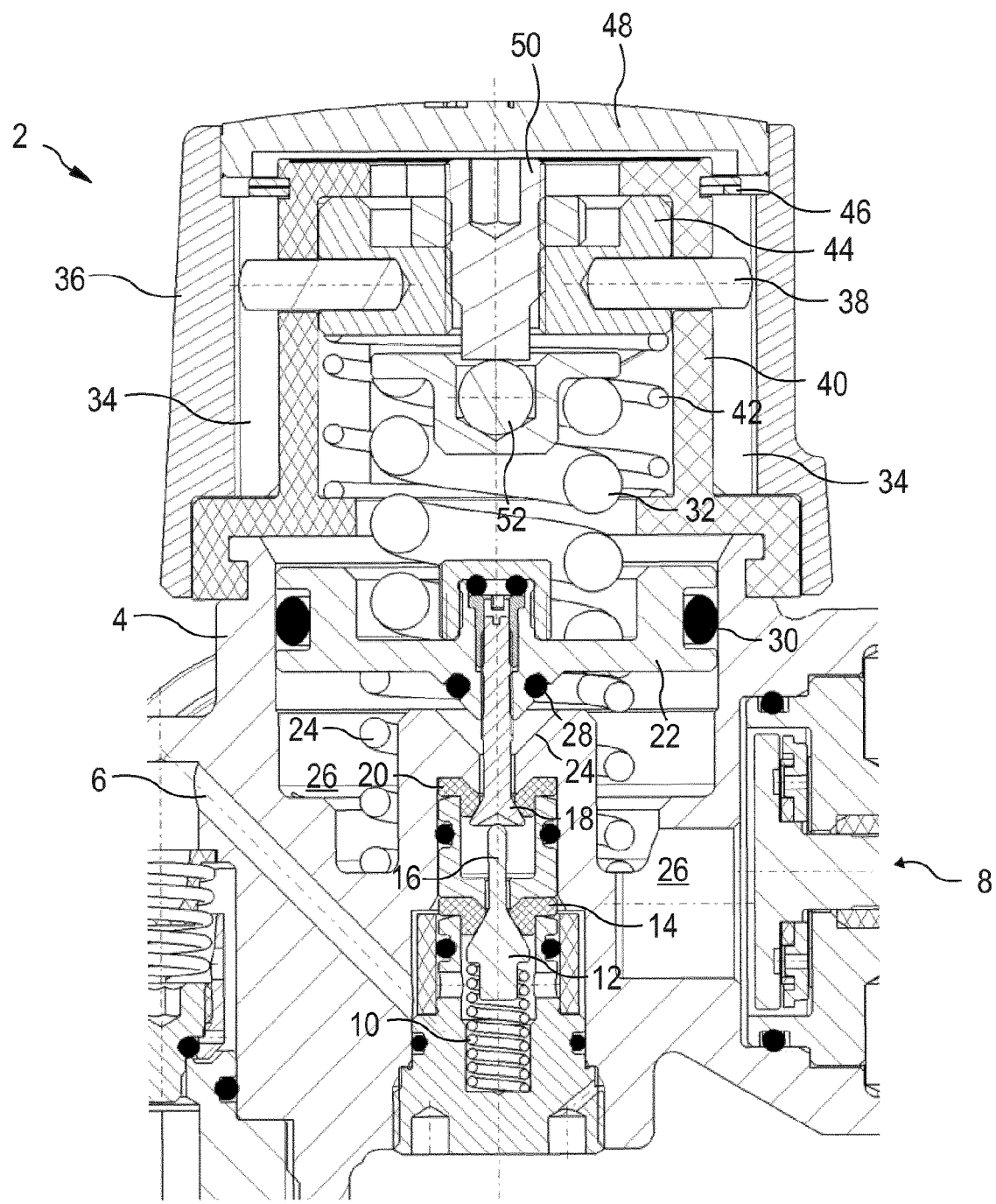

PRESSURE-REDUCING VALVE HAVING A RESIDUAL PRESSURE FUNCTION BUILT INTO THE REDUCING VALVE

CROSS-REFERENCE TO RELATED APPLICATIONS

The present invention is the US national stage under 35 U.S.C. §371 of International Application No. PCT/EP2013/064274, which was filed on Jul. 5, 2013, and which claims the priority of application LU 92040 filed on Jul. 9, 2012 the content of which (text, drawings and claims) are incorporated here by reference in its entirety.

FIELD

The invention relates to a flow and/or pressure control device for a fluid such as a pressurized gas. More particularly, the invention relates to a pressure-reducing valve for pressurized gas.

BACKGROUND

In the field of pressurized gas storage, particularly for storing in bottles or cylinders of some gases used in the medical field such as oxygen, it is common to provide a residual pressure function on the valves disposed on the bottles. It is basically a check-valve type device with a valve or shutter subjected to a closure elastic force and configured to open when the pressure in the bottle exceeds a rather low given value of the order of few bars. The purpose of this device is to prevent from putting the bottle in direct connection with air when empty. Indeed, in the absence of such a device, when the bottle is empty and the valve is left open, the ambient air of the bottle can come into contact with the inside of the bottle and thus potentially contaminate it. In addition, by connecting the valve outlet to a source of pressurized gas, it may also be possible to at least partially refill the bottle with a potentially contaminating gas. The above mentioned device allows a connection between the inside and the outside of the bottle only when in the presence of a service flow rate, which in practice prevents contamination against the service flow. It also prevents unauthorized forced refilling.

The patent document GB 2349200 A discloses a pressure-reducing valve for a bottle of pressurized gas, with a residual pressure function. The valve essentially comprises a body with a connector to be screwed on a bottle neck, an outlet and a passage connecting the inlet to the outlet. The valve also includes a refilling adapter with a check-valve in connection with the passage. It also includes a shut-off valve in the passage downstream of the branch with the refilling connection, and a pressure reducer disposed downstream of the shut-off valve. It also includes a flow rate selector in the form of a disk with calibrated holes, rotatably driven by a hand-wheel distinct from the hand-wheel of the closing valve. The residual pressure function is integrated in the pressure reducer. This latter includes a shutter mechanically connected to a mobile piston defining with the body a control chamber. The gas under pressure upstream of the shutter flows through a restricted passage and is expanded when passing the shutter in an intermediate position. It then flows through the piston to fill the control chamber defined by the upper face of the piston. If the gas pressure is too high, the resultant force on the piston will move it downwards so as to reduce the flow section of the shutter and vice versa. The upper face of the piston also comprises a concentric ring passage for the gas, this seal being intended to sealingly cooperate with a seat on a portion of the body opposite to the piston. The latter is subjected to an elastic force of a spring which tends to bring the seal in question closer to the seat and to open the shutter. In state of rest, the shutter is opened, which allows the passage of gas through the regulator to the seal in sealing contact with the seat. The hydraulic surface of the piston at the level of the seal in question is slightly greater than the opposite hydraulic surface on the side of the shutter. These two surfaces being subjected to the same pressure, the positive difference of surface between the upper face and the lower face of the piston generates a force directed downwards by lowering the piston and opening the passage between the seal and the seat. These thus form an integrated residual pressure valve in the regulator. The valve of this teaching is therefore particularly interesting from the standpoint of integration of the residual pressure function. However, it is a quite complex and bulky structure particularly because of the presence of the side closure valve.

Patent document U.S. Pat. No. 7,814,931 B2 discloses a flow control device for a fluid, particularly liquid, in particular for sprayers. This device is working at much lower pressures than in the above discussed teachings. The device comprises a body with a first element movable in translation and connected to the body via a sealed membrane. The first movable element is subjected to an elastic force tending to move towards a first seat formed in the body. The membrane is specifically designed to work with this seat. In the rest position, the spring holds the membrane in contact with the circular seat. The fluid passage through the first seat and is sealed by the membrane. The device further comprises a second movable member mechanically connected to the first one and cooperating with a second seat upstream of the first seat. The second movable member has the effect of modulating the fluid passage section upstream of the first seat and the first movable member. When it is decided to open the device, part of the elastic force tending to press the first movable member towards his seat is released. The fluid pressure at the inlet of the device applied to the membrane may move the first member and open the passage. If the pressure and therefore the flow weaken, the passage will be reduced in order to maintain pressure. If the pressure is weakening too much, the passage will automatically close, preventing from having a flow with a low flow rate. This teaching shows an interesting principle that a mobile element flow regulator can provide, namely the closure of the passage at a too low flow rate. However, it does not provide a secure closure of the passage as a significant input pressure is likely to move the first element and open the passage.

SUMMARY

The invention aims to provide a flow and/or pressure control device for a fluid able to achieve, in addition, a shut-off function and a residual pressure function in a simple and reliable fashion.

The invention is directed to a control device of the flow and/or pressure of a fluid, comprising:
  a body with an inlet, an outlet and a passage connecting the inlet to the outlet;
  a first shutter of the passageway;
  a movable element mechanically connected to the first shutter with a face defining with the body a control chamber downstream of the first shutter and comprising a portion adapted to come into contact in a fluid tight manner with the body to form a second shutter of the passageway;

first resilient means acting on the movable member, e.g., a pistion, in the opening direction of the first shutter and closing direction of the second shutter; wherein the first shutter is configured to close the passage by a movement substantially in the normal direction of flow of the fluid; and the first resilient means can be rendered inactive so as to allow closing of the first shutter and opening the second shutter.

According to various embodiments, the device comprises a second resilient means acting on the movable member in a direction of closing the first shutter and opening the second shutter.

According to various embodiments, the portion of the movable member forming the second shutter forms a closed perimeter with an average diameter that is lower, for example, by less than 50%, e.g., by less than 40%, e.g., by less than 30%, than that of the surface of the face of the movable member delimiting the control chamber.

According to various embodiments, the portion of the movable member forming the second shutter has a conical profile and the portion of body cooperating with the portion of the movable member has a corresponding conical profile.

According to various embodiments, the device comprises a circular seal housed in a groove formed in the conical portion of the movable member and/or of the body.

According to various embodiments, the device comprises a means for preloading and releasing the first resilient means, the first shutter closing and the second shutter opening under the force of the second resilient means when the first resilient means is released.

In various embodiments the preloading means comprises a rotatable control wheel, a slider acting on the first resilient means and a means for converting the rotational movement of the control wheel into translational motion of the slider. The slider can be arranged on the side of the first resilient means, opposite to the movable member.

In various embodiments the preloading means is configured not to present a stable position between two positions, one being the release of the first resilient means and the other being a preload of the resilient means.

According to various embodiments, the second resilient means comprises a spring disposed in the control chamber and bearing on the body.

According to various embodiments, the face of the movable member delimiting the control chamber and comprising the portion forming the second shutter is directed towards the first shutter.

According to various embodiments, the body comprises a portion projecting into the control chamber, the portion housing at least partially the first shutter and cooperating with the portion of the face of the movable member forming the second shutter.

According to various embodiments, the spring of the second resilient means is at least partially disposed around the body portion projecting into the control chamber.

According to various embodiments, the first shutter is adapted to sealingly cooperate with a seat in the passage and extends through the seat until upstream thereof.

According to various embodiments, the device comprises a third shutter disposed upstream of the first shutter and configured to close the passageway by movement essentially in the normal direction of flow of the fluid, the first and third shutters being configured to mutually cooperate so that the third shutter closes before the first one.

According to various embodiments, the third shutter is adapted to sealingly cooperate with a specific seat in the passage and extends through the seat from an upstream position to a downstream position of the seat so that the first shutter can come into contact with the third shutter.

According to various embodiments, the device is dimensioned so that in a service configuration the second shutter closes when the pressure at the inlet is less to 20 bar, for example, 10 bar, e.g., 5 bar.

According to various embodiments, the device is a valve for gas cylinder, capable to work at pressures above 50 bar, for example 100 bar, e.g., 150 bar.

The measures of the invention enable to provide a control device such as a regulator with integrated shut-off function and integrated residual pressure function. Indeed, the configuration of the first shutter such that it naturally closes with the pressure at the inlet of the apparatus ensures a reliable shut-off function. This function can be made safer by adding an additional shutter. The provision of the residual pressure valve on the movable element, in practice the piston, of the pressure regulator, and that on the face of the movable element facing the first shutter, reduces to a minimum the separation distance of the passage for the gas between the shutter of the pressure reducer and the shutter of the residual pressure. Reducing the length and thus the volume of this passage increases the protection that the residual pressure function is designed to provide to the internal volume of the bottle. Indeed, upon actuation of the means for preloading and releasing the first spring acting on the movable part of the pressure reducer, the passage between the position where the first shutter is closed and the second shutter is open to the opposite position, that is to say where the first shutter is opened and the second shutter is closed, causes during a fraction of a second a passage between the interior of the bottle and the external atmosphere. It is therefore important to minimize the volume between the two shutters.

DRAWINGS

FIG. 1 is a longitudinal sectional view of a flow and/or pressure control device for a fluid, according to various embodiments of the invention.

DETAILED DESCRIPTION

FIG. 1 illustrates a flow and/or pressure control device 2 of a fluid. This is a longitudinal sectional view showing the main elements of the device 2 relating to the invention, some of these elements that are not directly related to the invention are not illustrated.

In various embodiments, the device 2 illustrated in FIG. 1 can be a gas pressure reducing device for a pressurized gas that is, among others, stored in a bottle. In various implementations the device 2 can comprise a connector (not shown) with a male portion to be screwed to the neck of a bottle of pressurized gas.

In various embodiments, the device 2 comprises a body 4 in which is formed a passage connecting a gas inlet 6 with a gas outlet 8. The concept of entry is associated with the device shown here, except that it can include other features not visible in FIG. 1 due to the cutaway view. These other functions can then be such as to "move" the inlet 6 of the device 2 to a further upstream portion, in particular to a male part intended to be screwed on the neck of a bottle of pressurized gas and discussed above. The gas outlet 8 is illustrated in an incomplete fashion. In the specific case of FIG. 1, the gas outlet 8 includes a flow selector in the form of a rotating disc with calibrated orifices, known per se to the skilled person. However, it is understood that other forms of outlet 8 can be considered, such as including a single outlet without flow selector.

In various embodiments, the device 2 comprises a shut-off device of the passage consisting of a first shutter 18 and an additional shutter 12, cooperating, each, with a seat 20 and 14, respectively. These two shutters 12 and 18 are of the inverted seat type, i.e. where the direction of movement of the shutter towards closing of the passage corresponds to that of the fluid flow during normal service. The shutters will be described in detail later.

In various embodiments, the control device 2 also includes a piston 22 sealingly (via a seal 30) movable in translation in a cylindrical housing formed in the body 4. The lower face of the piston 22 defines with the body 4 a control chamber 26. The first shutter 18 is mechanically and rigidly connected to the piston 22. The latter also includes a seal 28 disposed on a conical portion concentric with the longitudinal axis of the piston 22 and the shutter 18. This seal 28 is housed in a groove formed in the conical portion and is intended to sealingly cooperate with a corresponding conical portion of the body into the control chamber 26. The seal 28 and the corresponding tapered portion serving as a seat form a second shutter providing a residual pressure function.

The piston 22 is subject on its upper side to a resilient force of the first resilient means, precisely a first spring 32, tending to open the first shutter 18 and to close the second shutter 24, 28 of residual pressure. The piston 22 is also subject to its underside to an elastic force of second resilient means, precisely the second spring 24, opposite to the first resilient means and thus tending to close the first shutter 18 and to open the second shutter 24, 28 of residual pressure.

The elastic force of the first spring 32 can be controlled by the control wheel 36 disposed at the top of the control device. In effect, the wheel 36 comprises two vertical grooves 34 formed on in its inner surface. Each of these grooves 34 cooperates with a pin 38 passing through an inclined groove formed in the sleeve 40 (the inclination of these grooves is not visible in the FIGURE). Each of the pins 38 is received or embedded in a slider 44 comprising in its center an adjustable pressure screw 50 on which a cup is supported via a ball 52. The latter is intended to enable a compression force transmission according to the longitudinal axis of the device 2 while minimizing the torque transmission of rotational force when the slider 44 moves in a combined movement of translation and rotation. Indeed, when the wheel 36 is rotated, the vertical grooves 34 transmit the rotation force to the pins 38 and the slider 44. The forced movement of the pins 38 along the inclined grooves formed in the sleeve 40 then imposes this combined movement of translation and rotation of the pins and thus also the slider 44. The cup supports the upper end of the first spring 32. The rotation of the wheel 36 can change the load of the spring 32 in question.

Although this is not visible in FIG. 1, the inclined grooves formed in the sleeve 40 each include a lower end with a stop notch. These stop notches are designed to allow a steady stop of the slider 44 in the down position, that is to say, a position of preload of the spring 32. In various implementations, the upper ends of the grooves can comprise no notches. Indeed, the control device comprises a third spring 42 housed in the sleeve and acting on the slider 44. When the wheel 36 is manipulated to disengage the pins 38 of the notches of the grooves, the combined elastic force of the springs 32 and 42 moves back the slider 44 upwardly while rotating the wheel 36. Once the first spring 32 is released, the third spring 42 is sized to exert a permanent elastic force on the slider 44 so as to maintain a mechanical clearance between it and the first spring 32. This makes it possible to ensure full relaxation of any elastic force on the piston 22 directed in the opening direction of the first shutter 18.

The sleeve 40 can be formed by two moulded plastic or composite parts, in the form of half shells. They can be symmetrical and comprise a flat surface at their lower groove cooperating with a rim of the body 4, so as to secure the sleeve 40 against rotation. During assembly, after assembly of the two half-shells, the wheel 36 is slid onto the outer cylindrical surface of the sleeve 40 and is held in place by a snap clip 46. This latter also stabilizes the assembly of the two half shells. A cover 48 can be disposed on the wheel 36. The pressure screw 50 can be adjusted via a tool cooperating in rotation with its upper end and by releasing the lock nut. This setting can be achieved in service when the first spring 32 is in the preloaded state.

As shown in FIG. 1, the control device 2 is in the closed state; that is to say that the compression force of the first spring 32 is completely released. The third spring 42 maintains the slider 44 in the upper position. The second spring 24 keeps the piston 22 in the upper position and the shutter in the closed position. More specifically, the first shutter 18, which is coupled to the piston 22, is pressed against its seat 20 under the force of the spring 24. The second shutter 24, 28 of residual pressure is open. The additional shutter 12 constituting a third shutter is also in the closed position under the action of the spring 10 and the absence of force opposed by the first shutter 18. The shutter device is doubly shut-off and thus provides a level of high security.

When it is desired to put the device 2 into operation in order to output gas, the wheel 36 is manipulated to set the slider 44 in the lower position. With reference to what has been mentioned previously, this lower position is a stable and predefined position. The spring 32 is preloaded and then exerts a force on the piston 22 which is directed downwardly. The closure device opens, more precisely the first shutter 18 opens and comes into contact with the rod 16 of the third shutter 12. The downward movement of the first shutter 18 after contacting the third shutter has for effect to open the third shutter. The pressurized gas can then flow along the passage through the respective seats 14 and 20 of the third and the first shutter 12 and 18. Pressure can then be established in the control chamber 26 before the second shutter 24, 28 can close. This pressure prevents the descent of the piston 22 to a closing of the shutter 24, 28 provided that a minimum pressure is present upstream of the device, that is to say in the bottle. Indeed, the pressure in the control chamber 26 acts on a large area generating a force capable of overcoming the resultant force of the spring 32 acting on the opposite face of the piston 22. In case of pressure drop upstream of the regulator, to such an extent that it becomes smaller than the range of operating pressure of the control chamber 26, the pressure therein will then no longer balance the force of the spring 32 and the piston 22 will move down until the shutter 24 and 28 of residual pressure closes. The first and third shutters 18 and 12 are then wide open. The gas can no longer pass and the inside the bottle to which the control device 2 is connected remains isolated from the external atmosphere.

Before refilling, the wheel 36 is normally manipulated to release the preload of the spring 32 and to allow the upward movement of the piston 22 under the force of the spring 24 and thereby closing the shutter device 18, 12.

For refilling the bottle, a specific connector connected to the inlet 6 of the control device 2 via a suitable valve can be used. Such a valve is partially visible in the lower left of FIG. 1. It is well known per se to the skilled person and will not be further detailed. Since the gas must not pass through the shutters 18, 12 and 24/28, they should not be manipulated and the passage remains closed.

In case the operation of releasing the preload of the spring 32 would not have taken place before refilling of the bottle, only the shutter 24, 28 for residual pressure is closed, the other two 18 and 12 being open. When the pressure in the bottle increases as it is refilled, the force resulting from the pressure on the piston surface 22 bounded by the seal 28 is not sufficient to move the piston 22. Indeed, the diameter of the torus or ring formed by the seal 28 is substantially lower than that of the piston 22 itself. The surface on which the hydraulic pressure is applied resulting in a force opposite to the spring 32 is then particularly lower than the surface of the hydraulic piston 22 since these surfaces are proportional to the square of the diameter (or radius).

It is then necessary to manipulate the wheel 36 to release the preload of the spring 32 and allow the return movement of the piston 22. The residual pressure valve will then open and, at the same time, the shutters 18 and 12 will close.

When one wishes to activate the control device, it is sufficient to operate the wheel to preload the spring 32. The shutters 18 and 12 will then be opened and the gas can flow into the control chamber 26. As previously mentioned, it is only when the pressure upstream of the device 2, that is to say, the pressure in the bottle to which the control device 2 is connected falls below a predetermined pressure that the shutter 24, 28 for residual pressure closes. This pressure essentially corresponds to the working pressure range in the control chamber 26.

In the description of the various embodiments of the invention which has just been made, the shut-off device of the pressure regulator is of the double shutters type. However, it is understood that the invention is also applicable to a control device provided with another shutter, in particular as a simple shutter.

Also in the description of the various embodiments of the invention which has just been made, the movable element of the pressure reducer is a piston of a particular geometry. However, it is understood that it can take other forms. The movable element of the regulator can further comprise a metal bellows sealing with the body for delimiting the control chamber.

Also in the description of the various embodiments of the invention which has just been made, the connection between the piston and the shutter is a rigid mechanical connection. However, it can present some degree of freedom as a mechanical connection allowing limited relative movement between the two.

What is claimed is:

1. A control device for controlling the flow and/or pressure of a fluid, said device comprising:
   a body with an inlet, an outlet and a passageway connecting the inlet to the outlet;
   a first shutter of the passageway;
   a piston mechanically connected to the first shutter with a face defining with the body a control chamber downstream of the first shutter and comprising a portion structured and operable to come into contact in a fluid tight manner with the body to form a second shutter of the passageway; and
   a first resilient element acting on another face of the piston in the opening direction of the first shutter and closing direction the second shutter, the another face defining with the body a chamber that is permanently at ambient atmospheric pressure wherein:
   the first shutter is structured and operable to close the passage by a movement substantially in a direction of flow of the fluid; and
   the control device is structured and operable so that in a service configuration the second shutter closes when the pressure at the inlet is less than a predetermined residual pressure, so as to achieve a residual pressure function.

2. The control device according to claim 1, wherein the portion of the piston forming the second shutter forms a closed perimeter with an average diameter that is lower than the diameter of the surface of the face of the piston delimiting the control chamber.

3. The control device according to claim 1, wherein the portion of the piston forming the second shutter forms a closed perimeter with an average diameter that is 50% lower than the diameter of the surface of the face of the piston delimiting the control chamber.

4. The control device according to claim 1, wherein the portion of the piston forming the second shutter forms a closed perimeter with an average diameter that is 40% lower than the diameter of the surface of the face of the piston delimiting the control chamber.

5. The control device according to claim 1, wherein the portion of the piston forming the second shutter forms a closed perimeter with an average diameter that is 30% lower than the diameter of the surface of the face of the piston delimiting the control chamber.

6. The control device according to claim 1, wherein the face of the piston delimiting the control chamber and comprising the portion forming the second shutter is directed towards the first shutter.

7. The control device according to claim 1, wherein the first shutter is structured and operable to sealingly cooperate with a seat in the passage and extends through the seat until upstream thereof.

8. The control device according to claim 1, wherein predetermined residual pressure is comprised between 5 and 20 bar.

9. The control device according to claim 1, wherein the predetermined residual pressure is comprised between 5 and 10 bar.

10. The control device according to claim 1, wherein the device is a valve designed and configured for being mounted on a gas cylinder, capable to work at pressures above 50 bar.

11. The control device according to claim 1, wherein the device is a valve designed and configured for being mounted on a gas cylinder, capable to work at pressures above 150 bar.

12. The control device according to claim 1, wherein the first resilient element can be rendered inactive so as to allow closing of the first shutter and opening the second shutter.

13. The control device according to claim 1, wherein the portion of the piston forming the second shutter has a conical profile and the body comprises a portion cooperating with the portion of the piston and having a corresponding conical profile.

14. The control device according to claim 13 further comprising a circular seal housed in a groove formed in at least one of the conical portion of the piston and the body.

15. The control device according to claim 1 further comprising a third shutter disposed upstream of the first shutter and structured and operable to close the passageway by movement essentially in the direction of flow of the fluid, the first and third shutters being structured and operable to mutually cooperate so that the third shutter closes before the first one.

16. The control device according to claim 15, wherein the third shutter is structured and operable to sealingly cooperate with a specific seat in the passage and extends through the seat from an upstream position to a downstream position of the seat so that the first shutter can come into contact with the third shutter.

17. The control device according to claim 1 further comprising a second resilient element acting on the piston in a direction of closing the first shutter and opening the second shutter.

18. The control device according to claim 17 further comprising an element for preloading and releasing the first resilient element, the first shutter closing and the second shutter opening under the force of the second resilient element when the first resilient element is released.

19. The control device according to claim 17, wherein the second resilient element comprises a spring disposed in the control chamber and bearing on the body.

20. The control device according to claim 19, wherein the body comprises a portion projecting into the control chamber, the portion housing at least a portion of the first shutter and cooperating with the portion of the face of the piston forming the second shutter.

21. The control device according to claim 20, wherein the spring of the second resilient element is at least partially disposed around the body portion projecting into the control chamber.

\* \* \* \* \*